US012631307B2

(12) United States Patent
Kim et al.

(10) Patent No.: US 12,631,307 B2
(45) Date of Patent: May 19, 2026

(54) VEHICLE LAMP

(71) Applicant: SL Corporation, Daegu (KR)

(72) Inventors: Hyeongdo Kim, Gyeongsan-si (KR); Minseop Lee, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/969,477

(22) Filed: Dec. 5, 2024

(65) Prior Publication Data

US 2025/0189092 A1 Jun. 12, 2025

(30) Foreign Application Priority Data

Dec. 11, 2023 (KR) ........................ 10-2023-0178970

(51) Int. Cl.

*F21S 41/265* (2018.01)
*F21S 41/143* (2018.01)
*F21S 41/151* (2018.01)
*F21S 43/15* (2018.01)
*F21S 43/20* (2018.01)

(52) U.S. Cl.

CPC ........... *F21S 41/265* (2018.01); *F21S 41/143* (2018.01); *F21S 41/151* (2018.01); *F21S 43/15* (2018.01); *F21S 43/2621* (2024.05)

(58) Field of Classification Search

CPC .............................. F21S 41/265; F21S 41/285
See application file for complete search history.

(56) References Cited

U.S. PATENT DOCUMENTS

| | | | | |
|---|---|---|---|---|
| 10,634,307 | B2 * | 4/2020 | Kim | B60Q 1/0011 |
| 11,644,170 | B2 * | 5/2023 | Go | F21S 41/265 362/520 |
| 2016/0265733 | A1 * | 9/2016 | Bauer | F21S 41/16 |
| 2018/0320852 | A1 * | 11/2018 | Mandl | F21S 41/151 |
| 2019/0024865 | A1 * | 1/2019 | Kim | F21S 41/285 |
| 2019/0072252 | A1 * | 3/2019 | Moser | F21S 41/68 |
| 2022/0403997 | A1 * | 12/2022 | Lee | F21S 41/265 |
| 2023/0358388 | A1 * | 11/2023 | Kang | F21V 5/007 |
| 2025/0198583 | A1 * | 6/2025 | Kim | F21S 41/663 |

* cited by examiner

*Primary Examiner* — Eric T Eide

(74) *Attorney, Agent, or Firm* — United One Law Group LLC; Kongsik Kim; Jhongwoo Peck

(57) ABSTRACT

A vehicle lamp includes a light source unit that includes at least one light source and generates light; an optical path adjustment unit that adjusts a path of the light incident from the light source unit to allow the light to become substantially parallel with an optical axis of the optical path adjustment unit; and an optical unit that transmits at least some of the light emitted by the optical path adjustment unit to form a predetermined beam pattern. The optical unit includes a plurality of incident lenses and a plurality of exit lenses corresponding to the plurality of incident lenses. In particular, a ratio of at least one lens parameter between a first pair of incident and exit lenses is different from a ratio of the at least one lens parameter between a second pair of incident and exit lenses.

20 Claims, 15 Drawing Sheets

VEHICLE LAMP

CROSS-REFERENCE TO RELATED APPLICATION

This application claims priority from Korean Patent Application No. 10-2023-0178970 filed on Dec. 11, 2023, which is incorporated herein by reference in its entirety.

BACKGROUND

1. Technical Field

The present disclosure relates to a vehicle lamp, and more specifically, to a vehicle lamp capable of forming an optimal beam pattern.

2. Description of the Related Art

In general, various lamps are provided in vehicles for the purpose of enabling the drivers to easily identify objects around the vehicles during low-light conditions (e.g., night-time driving) and to signal the vehicles' driving status to surrounding vehicles or pedestrians.

For example, headlamps and fog lamps are primarily intended for illumination purposes, while turn signal lamps, tail lamps, and brake lamps are primarily intended for signaling purposes. Each lamp is regulated by laws regarding its installation standards and specifications to ensure that it fully performs its intended functions.

Among these, the headlamps play an important role in ensuring safe driving by projecting light in the direction of the vehicles' movement to secure the drivers' forward visibility.

The headlamps can form a low beam pattern in which light is projected below the cutoff line, or a high beam pattern in which at least part of the light is projected above the cutoff line. When forming the low beam pattern, if light is projected above the cutoff line, it can cause glare to the drivers of the vehicles ahead. Therefore, a means to prevent light from being projected above the cutoff line during the formation of the low beam pattern is required.

SUMMARY

Aspects of the present disclosure provide a vehicle lamp that can form an optimal beam pattern by preventing light from being emitted in unnecessary and undesired directions.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, vehicle lamp may include at least one lamp module, and the at least one lamp module may include a light source unit that includes at least one light source and generates light; an optical path adjustment unit that adjusts a path of the light emitted from the light source unit; and an optical unit that transmits at least some of the light emitted from the optical path adjustment unit to form a predetermined beam pattern. The optical unit may include a plurality of incident lenses and a plurality of exit lenses corresponding to the plurality of incident lenses. In particular, a ratio of at least one lens parameter between an exit lens, among the plurality of exit lenses, and a corresponding incident lens, among the plurality of incident lenses, is different from a ratio of the least one lens parameter between another exit lens, among the plurality of exit lenses, and a corresponding incident lens, among the plurality of incident lenses.

Herein, the at least one lens parameter may include at least one of curvature or diameter.

A focal distance of at least some incident lenses among the plurality of incident lenses may be greater than a focal distance of corresponding exit lenses among the plurality of exit lenses.

In some embodiments, the plurality of incident lenses may include a first incident lens and a second incident lens, and the plurality of exit lenses may include a first exit lens and a second exit lens that correspond to the first incident lens and the second incident lens, respectively. A ratio of a focal distance of the first exit lens to a focal distance of the first incident lens may differ from a ratio of a focal distance of the second exit lens to a focal distance of a second incident lens.

A ratio of a focal distance of at least some exit lenses, among the plurality of exit lenses, to a focal distance of corresponding incident lenses, among the plurality of incident lenses, may gradually increase or decrease going from one side to the other in at least one direction across the optical unit.

Either the plurality of incident lenses or the plurality of exit lenses may exhibit an equal focal distance.

A focus of the first incident lens and a focus of the first exit lens may be formed at a same location, and a focus of the second incident lens and a focus of the second exit lens may be formed at different locations. A ratio of a respective focal distance of at least some exit lenses, among the plurality of exit lenses, to a respective focal distance of corresponding incident lenses, among the plurality of incident lenses, may be equal to or less than the ratio of the focal distance of the first exit lens to the focal distance of the first incident lens.

The first incident lens and the second incident lens may have different curvatures, thereby exhibiting different focal distances. The first exit lens and the second exit lens may have different curvatures, thereby exhibiting different focal distances.

In some embodiments, the plurality of incident lenses may include a first incident lens and a second incident lens, and the plurality of exit lenses may include a first exit lens and a second exit lens that correspond to the first and second incident lenses, respectively. A ratio of a diameter of the first exit lens to a diameter of the first incident lens may differ from a ratio of a diameter of the second exit lens to a diameter of the second incident lens.

A ratio of a diameter of at least some exit lenses, among the plurality of exit lenses, to a diameter of corresponding incident lenses, among the plurality of incident lenses, may gradually increase or decrease going from one side to the other in at least one direction across the optical unit.

Either the plurality of incident lenses or the plurality of exit lenses may have an equal diameter. The first incident lens and the first exit lens may have an equal diameter, and the second incident lens and the second exit lens may have different diameters.

A ratio of a diameter of an exit lens among the plurality of exit lenses to a diameter of a corresponding incident lens among the plurality of incident lenses may be equal to or greater than a ratio of the diameter of the first exit lens to the diameter of the first incident lens.

The first incident lens and the second incident lens may have different diameters. The first exit lens and the second exit lens may have different diameters.

Each of the plurality of exit lenses may be formed with a greater height in an up-down direction than a width in a left-right direction.

The optical unit may further include a plurality of shields that block some of light from proceeding toward the plurality of exit lenses.

The optical unit may be formed to be tilted to allow one side thereof to be positioned more forward relative to the other side thereof in at least one direction.

The vehicle lamp according to the present disclosure can achieve the following effects.

By configuring the ratio between the lens parameters of incident lenses and the lens parameters of the respective exit lenses to vary, the optimal light distribution characteristics of a beam pattern can be achieved, while reducing the amount of light emitted in unnecessary or undesired directions. This results in an improvement in glare reduction.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
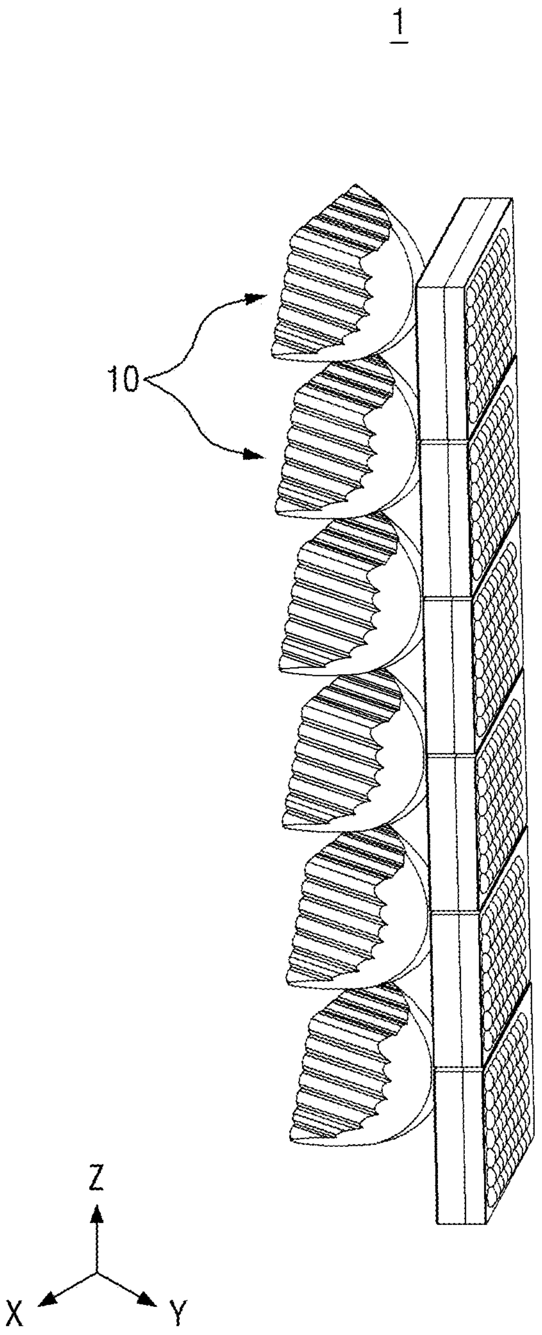
FIG. 1 is a perspective view illustrating a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Embodiments of the present disclosure will hereinafter be described with reference to the accompanying drawings.

Figure 2:
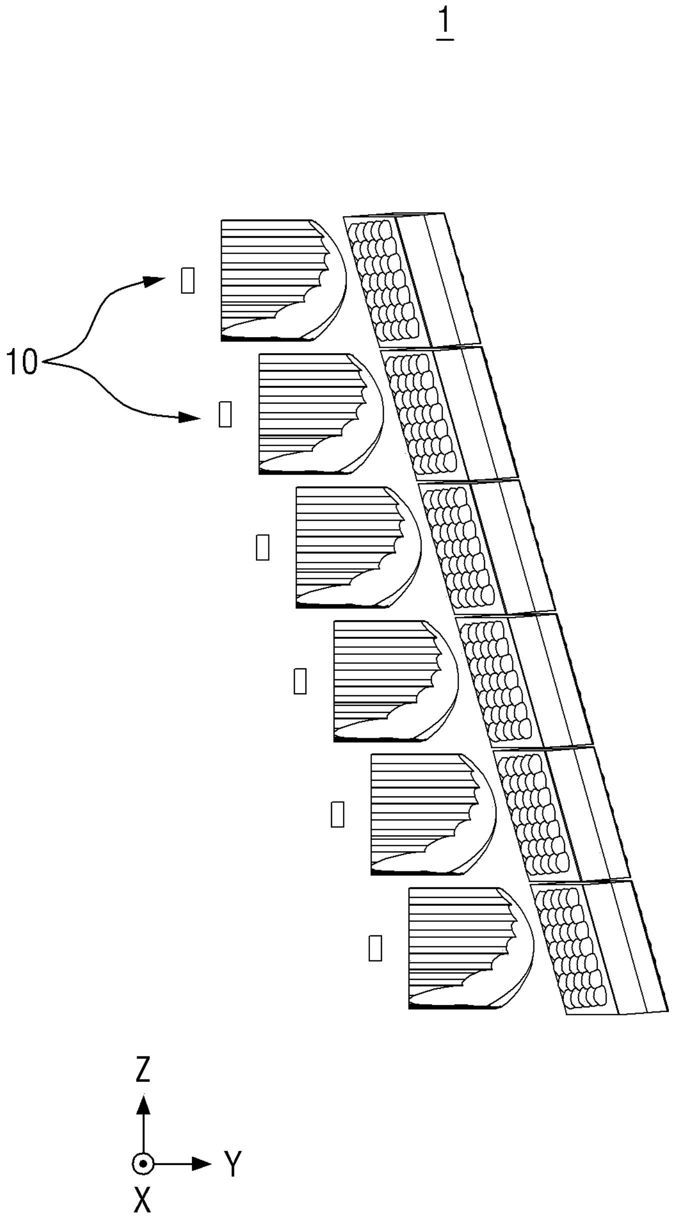
FIG. 2 is a side view illustrating the vehicle lamp according to an embodiment of the present disclosure.
Figure 3:
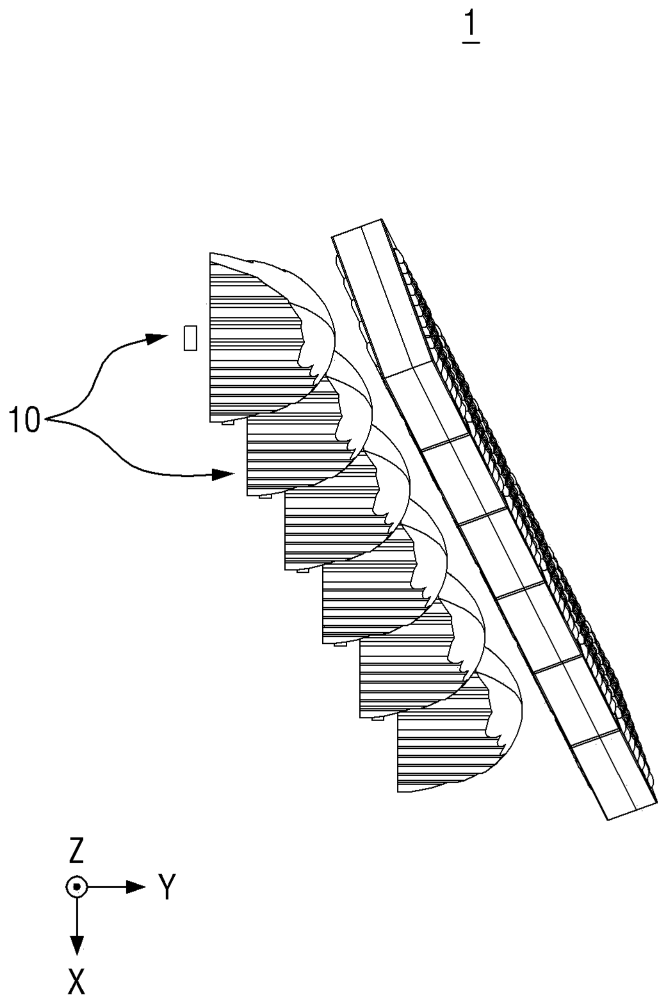
FIG. 3 is a plan view illustrating the vehicle lamp according to an embodiment of the present disclosure.

FIG. 1 is a perspective view illustrating a vehicle lamp according to an embodiment of the present disclosure, FIG. 2 is a side view illustrating the vehicle lamp according to an embodiment of the present disclosure, and FIG. 3 is a plan view illustrating the vehicle lamp according to an embodiment of the present disclosure.

Referring to FIGS. 1 through 3, a vehicle lamp 1 according to an embodiment of the present disclosure may include a plurality of lamp modules 10 that are arranged in at least one direction. In embodiments of the present disclosure, an X axis refers to a left-right direction, i.e., the width direction or the lateral direction of a vehicle, a Y axis refers to a front-rear direction, i.e., the driving direction or the longitudinal direction of the vehicle, and a Z axis refers to an up-down direction, i.e., the height direction or the vertical direction of the vehicle. However, the present disclosure is not limited to this, and depending on the direction or position in which the vehicle lamp 1 is installed, the actual directions represented by the X-axis, Y-axis, and Z-axis may vary.

In embodiments of the present disclosure, the vehicle lamp 1 may be used as a headlamp that illuminates the vehicle's driving direction when the vehicle is operated at night or in a dark place such as a tunnel, to secure forward visibility, but the present disclosure is not limited thereto. The vehicle lamp 1 may be used not only as a headlamp but also as various other lamps installed in the vehicle, such as a fog lamp, daytime running lamp, turn signal lamp, tail lamp, backup lamp, or brake lamp. The vehicle lamp 1 may be used for any one of these lamps or for two or more of these lamps simultaneously.

Figure 4:
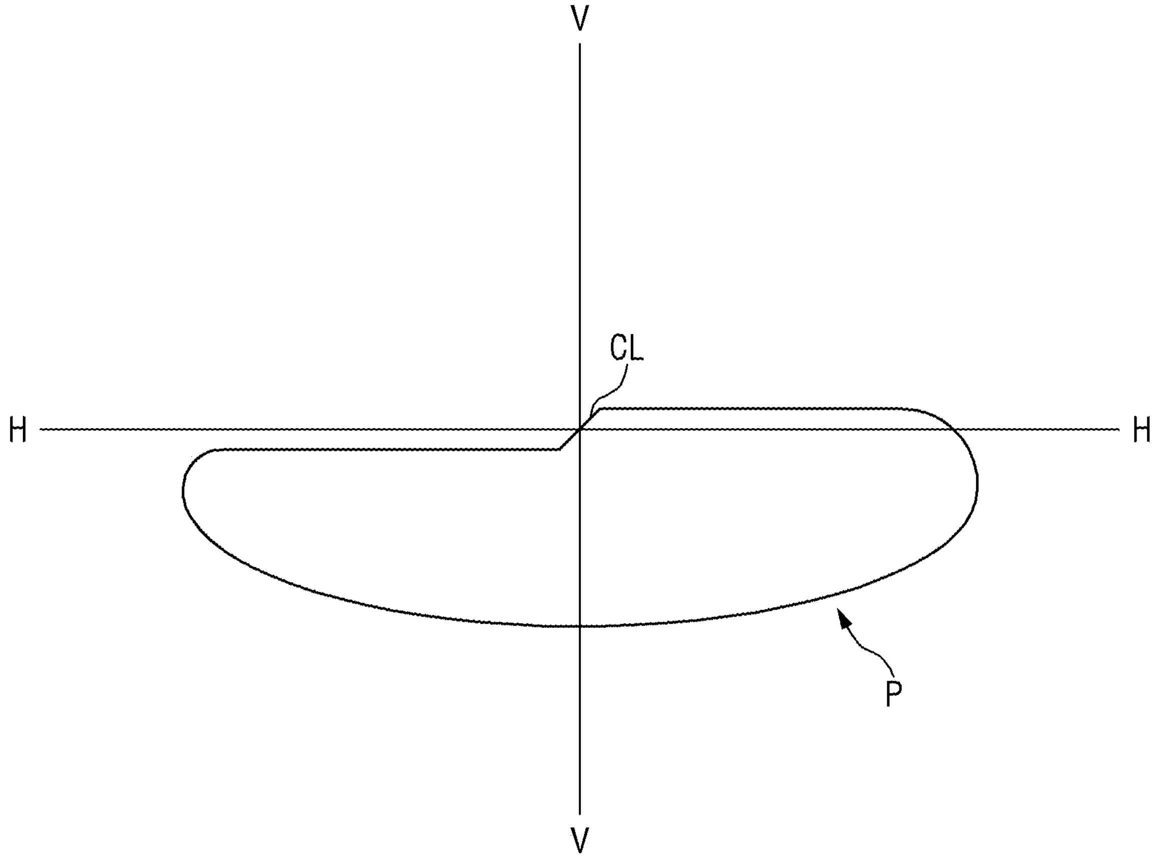
FIG. 4 is a schematic diagram illustrating a beam pattern formed by the vehicle lamp according to an embodiment of the present disclosure.

When the vehicle lamp 1 is used as a headlamp, it may form at least one of the following: a low beam pattern, where light is projected below a predetermined cutoff line to prevent glare for the drivers of preceding or oncoming vehicles while securing a wider field of view at a short distance in front of the vehicle; and a high beam pattern, where at least part of the light is projected above the cutoff line to secure a longer-range field of view in front of the vehicle. The vehicle lamp 1 will hereinafter be described as forming, for example, a low beam pattern with a predetermined cutoff line CL, as illustrated in FIG. 4.

Meanwhile, in embodiments of the present disclosure, the vehicle lamp 1 may include a plurality of lamp modules 10 that are arranged in the up-down direction, but the present disclosure is not limited thereto. The number of lamp modules 10 and their arrangement direction in the vehicle lamp 1 may vary depending on the light distribution characteristics of the beam pattern to be formed by the vehicle lamp 1, i.e., the position, size, shape, and brightness of the area to be illuminated by the vehicle lamp 1.

The lamp modules 10 may be arranged in the up-down direction such that they become closer to the front side and the right side of the vehicle along going from the upper side to the lower side of the vehicle such that they are aligned with the body lines of the vehicle.

In other words, the vehicle lamp 1 may be housed within an internal space formed by a lamp housing and a cover lens attached to the lamp housing. This is for arranging the lamp modules 10 to correspond to the shape of the cover lens that forms parts of the vehicle's body lines.

For example, when the cover lens has a flat shape facing directly forward, the lamp modules 10 may be arranged in the up-down direction to be aligned with one another in both the front-rear and left-right directions. Conversely, if the cover lens has a flat or curved shape formed at a predetermined angle relative to the front, the lamp modules 10 may be arranged in the up-down direction to be offset from one another in the front-rear or left-right direction.

The beam pattern formed by the vehicle lamp 1 may be created by the superposition or combination of the beam patterns formed by the respective lamp modules 10. For example, the beam pattern formed by the vehicle lamp 1 may result from the superposition of beam patterns with the same light distribution characteristics formed by the lamp modules 10, or from the combination of beam patterns with different light distribution characteristics formed by the lamp modules 10.

Figure 5:
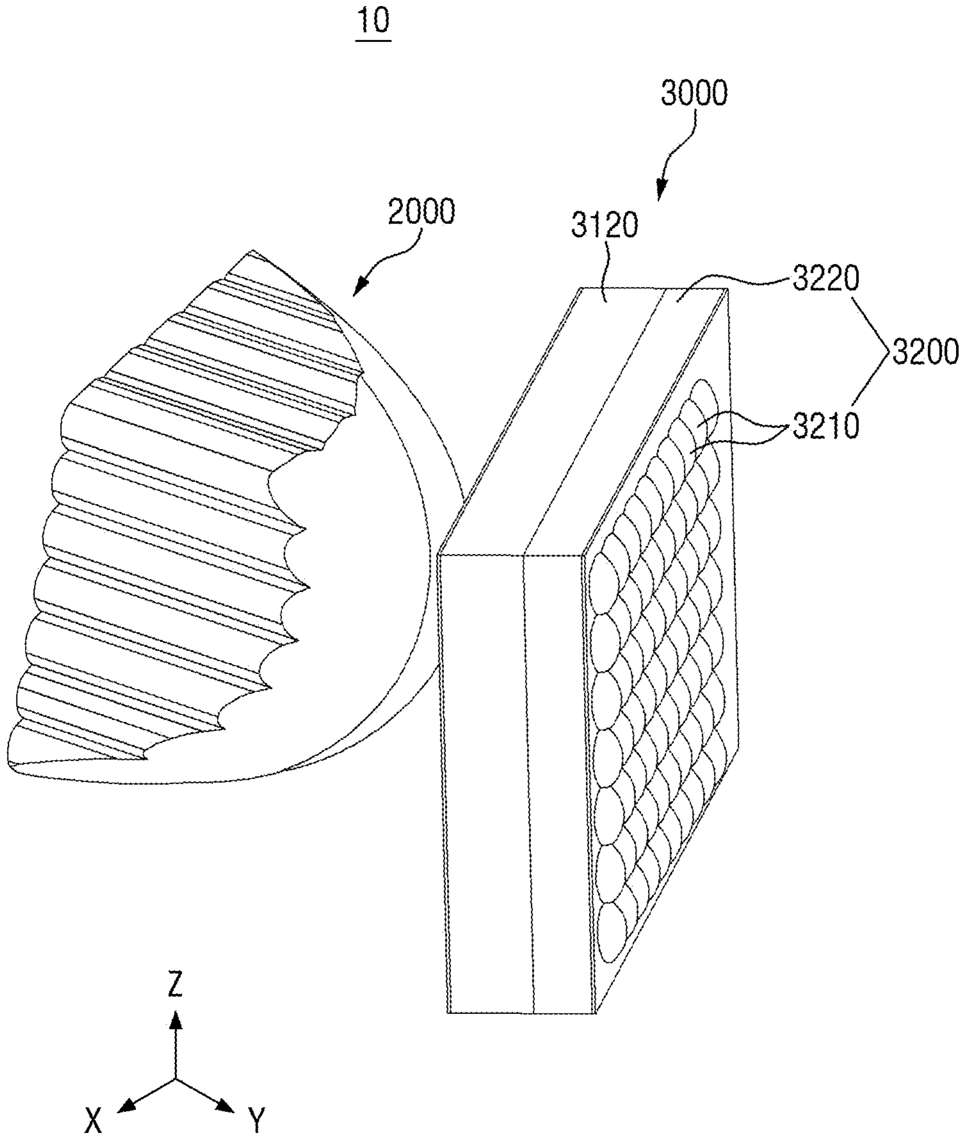
FIGS. 5 and 6 are perspective views illustrating a lamp module according to an embodiment of the present disclosure.
Figure 6:
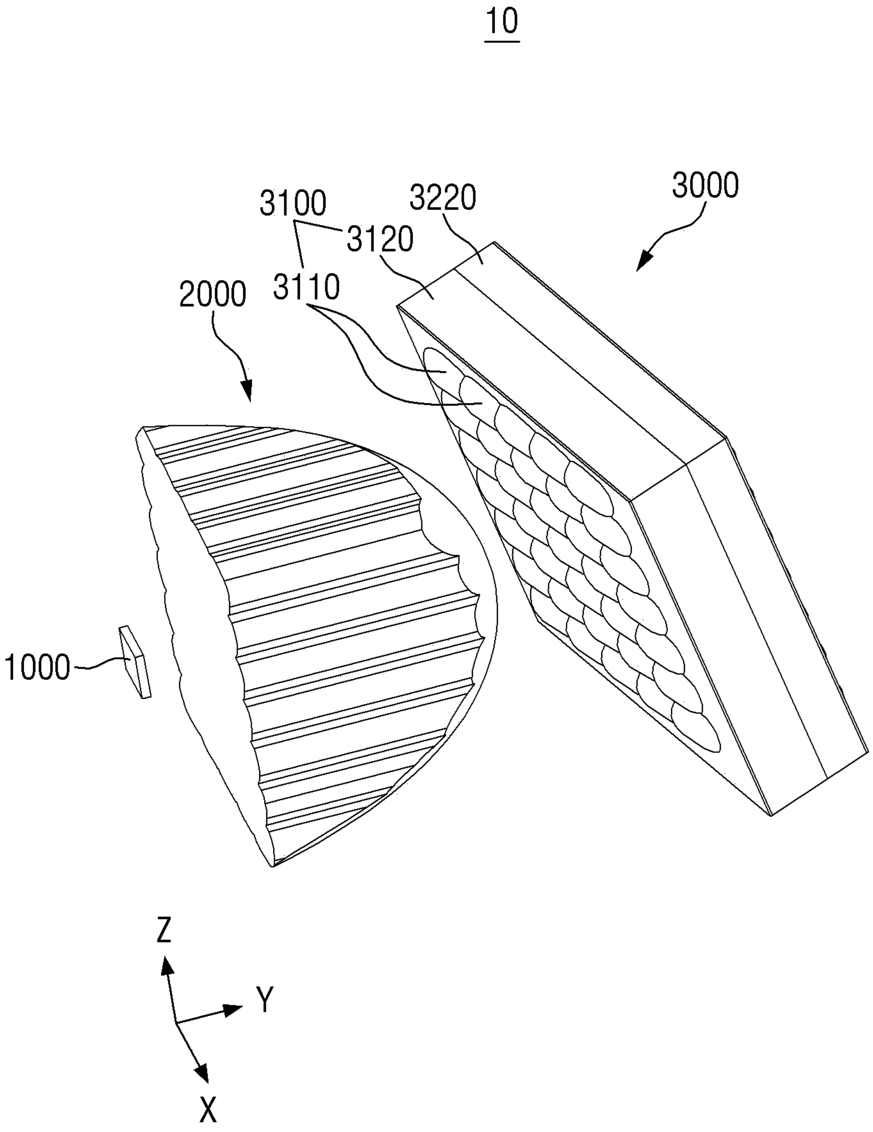
Figure 7:
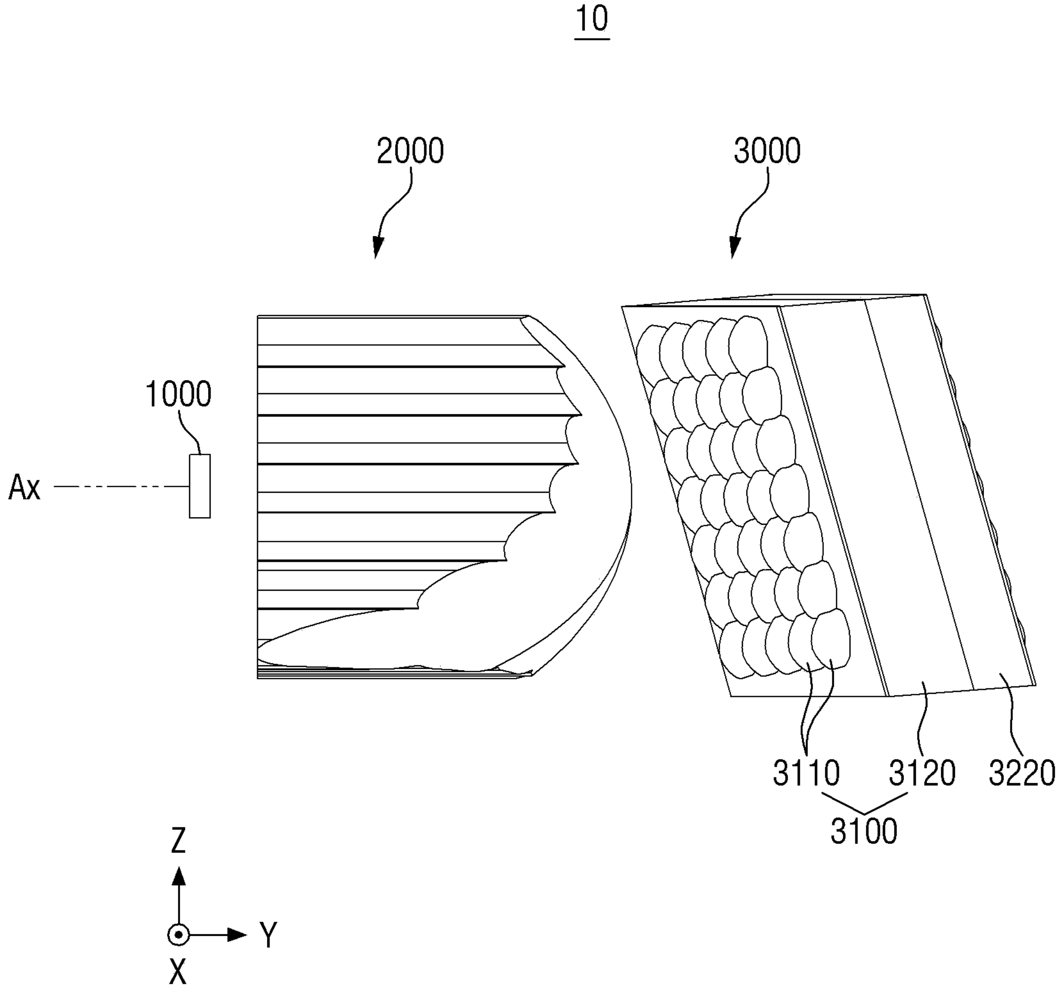
FIG. 7 is a side view illustrating the lamp module according to an embodiment of the present disclosure.
Figure 8:
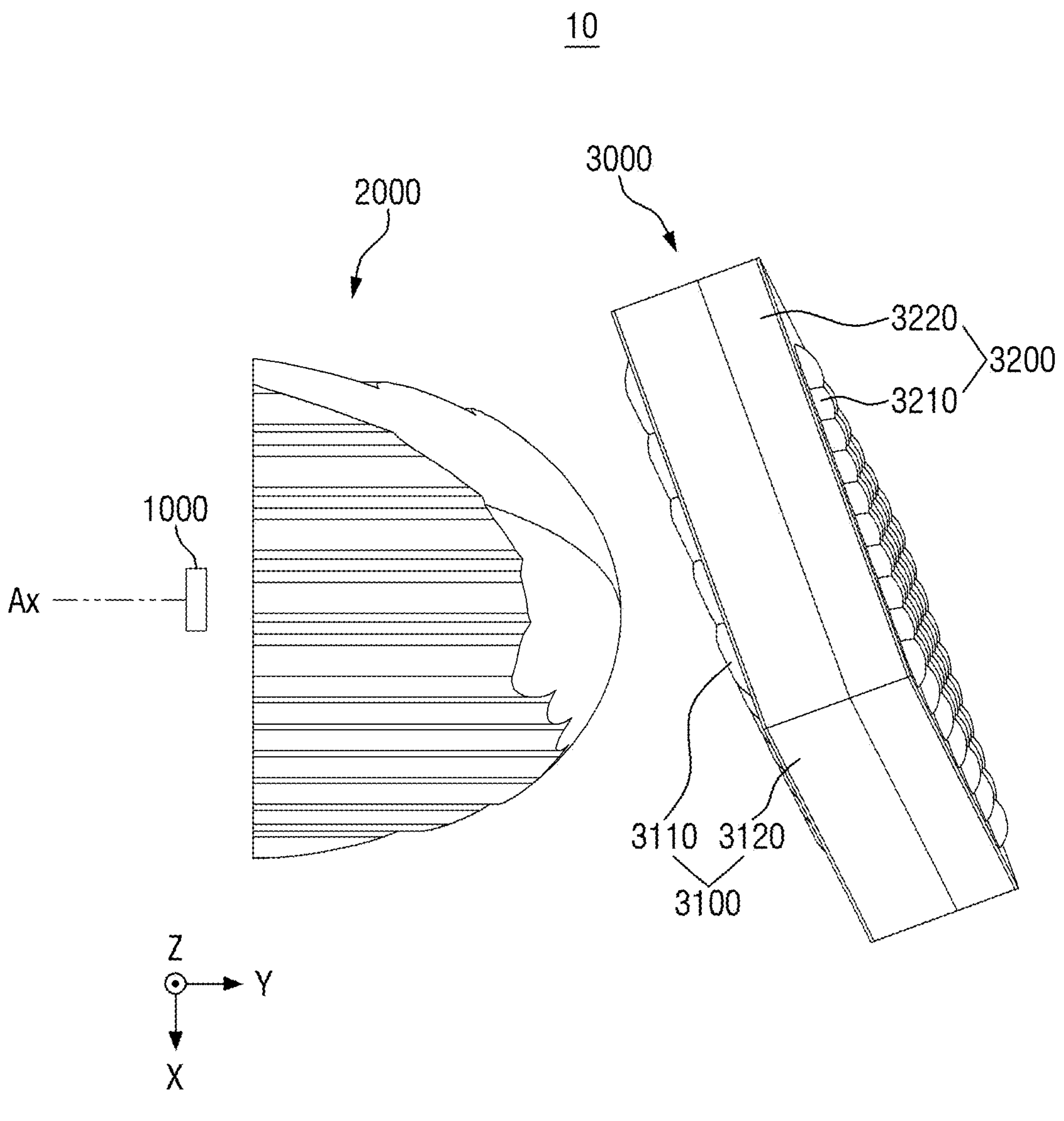
FIG. 8 is a plan view illustrating the lamp module according to an embodiment of the present disclosure.

FIGS. 5 and 6 are perspective views illustrating a lamp module according to an embodiment of the present disclosure, FIG. 7 is a side view illustrating the lamp module according to an embodiment of the present disclosure, and FIG. 8 is a plan view illustrating the lamp module according to an embodiment of the present disclosure. FIGS. 5 through 8 illustrate one of the plurality of lamp modules 10, and the description of the lamp module 10 illustrated in FIGS. 5 through 8 may be similarly applicable to the other lamp modules 10.

Referring to FIGS. 5 through 8, a lamp module 10 according to an embodiment of the present disclosure may include a light source unit 1000, an optical path adjustment unit 2000, and an optical unit 3000.

The light source unit 1000 may include one or more light sources that emit light with the quantity and/or color suitable for the purpose of the vehicle lamp 1. Depending on the purpose of the vehicle lamp 1, at least one of the brightness or color of the light emitted from the light source unit 1000 may be varied.

In embodiments of the present disclosure, semiconductor light-emitting devices such as light-emitting diodes (LEDs) may be used as the light sources of the light source unit 1000, but the present disclosure is not limited thereto. Various types of light sources such as laser diodes (LDs) or bulbs may also be used as the light sources of the light source unit 1000. Additionally, components such as reflectors, mirrors, prisms, or phosphors may be additionally used depending on the type of the light sources to control the brightness, path, or color of light.

The optical path adjustment unit 2000 may be disposed in front of the light source unit 1000 and may adjust the light emitted with a predetermined illumination range from the light source unit 1000 into a substantially parallel light beam for emission. As a result, the light emitted from the light source unit 1000 may be more uniformly incident on the optical unit 3000, which is disposed in front of the optical path adjustment unit 2000, ensuring that the beam pattern formed by the vehicle lamp 1 generally has more uniform brightness.

In other words, the light source unit 1000 may emit light having a predetermined angular range with respect to the optical axis Ax, which is an axis passing through the center of an emission area, while the optical path adjustment unit 2000 may adjust the path of the light so that the light may be substantially parallel to the optical axis Ax.

In embodiments of the present disclosure, an aspheric lens may be used as the optical path adjustment unit 2000, but the present disclosure is not limited thereto. That is, various types of lenses capable of adjusting the light incident from the light source unit 1000 into parallel light, such as a Fresnel lens or a total internal reflection (TIR) lens, may also be used.

The optical path adjustment unit 2000 may be disposed in front of the light source unit 1000, and the optical unit 3000 may be disposed in front of the optical path adjustment unit 2000, assuming that light is emitted forward from the vehicle lamp 1. However, depending on the installation position or direction of the vehicle lamp 1, the actual meaning of the term "front" or "forward" may vary.

The optical unit 3000 may transmit at least some of the light emitted from the optical path adjustment unit 2000 to form a beam pattern suitable for the purpose of the vehicle lamp 1.

Figure 9:
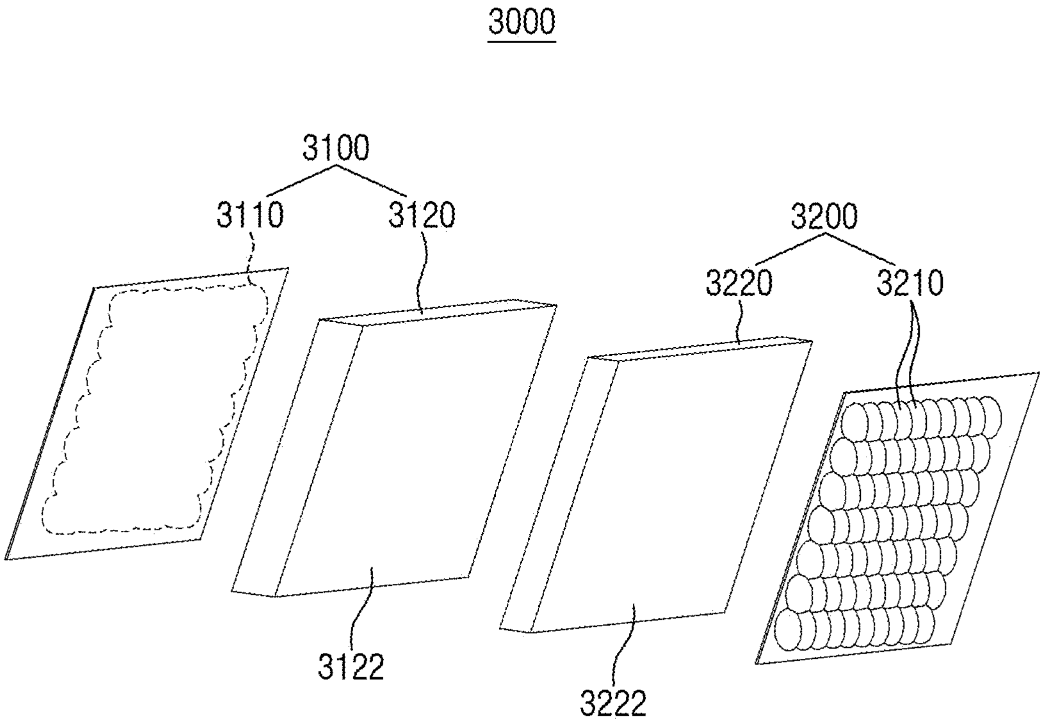
FIGS. 9 and 10 are exploded perspective views illustrating an optical unit according to an embodiment of the present disclosure.
Figure 10:
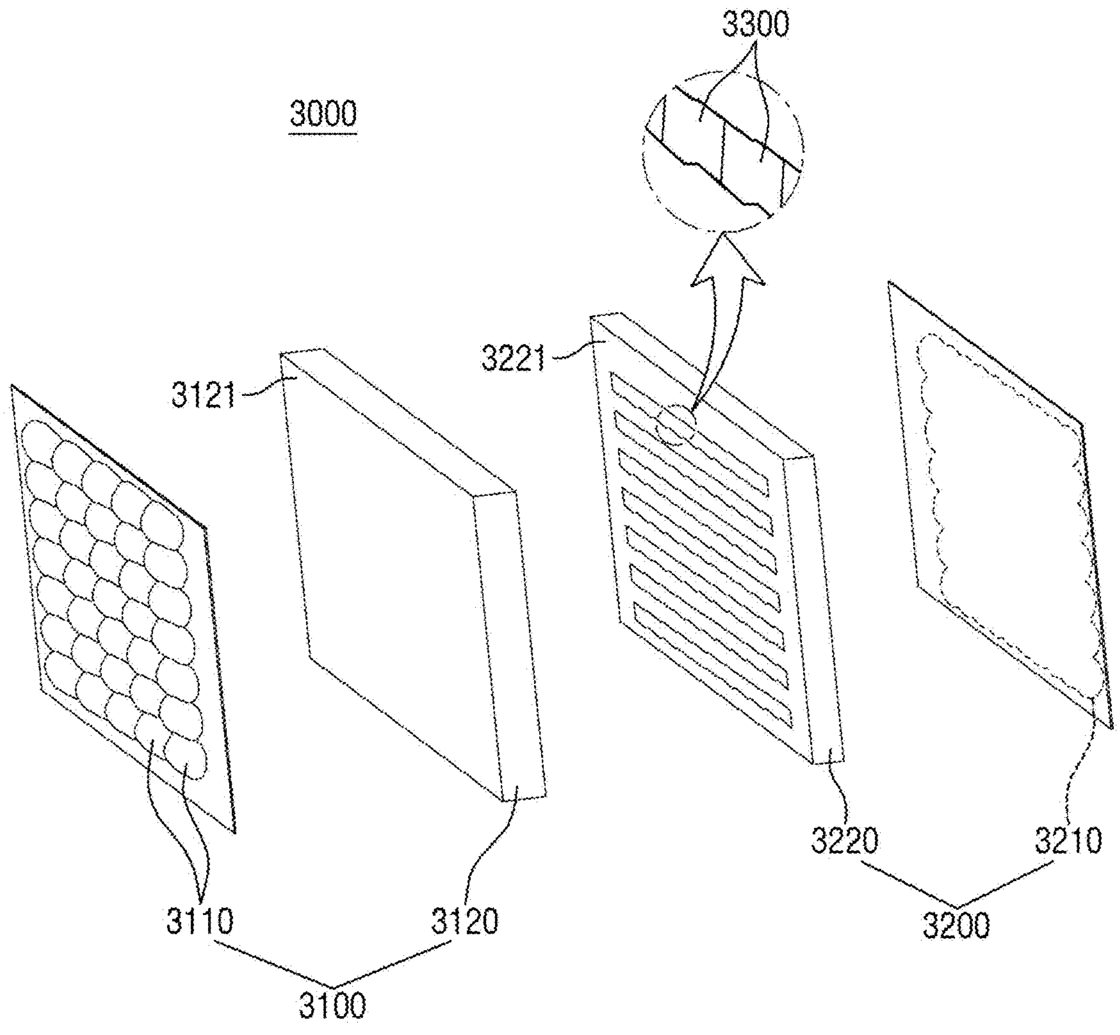

FIGS. 9 and 10 are exploded perspective views illustrating an optical unit according to an embodiment of the present disclosure. Referring to FIGS. 9 and 10, an optical unit 3000 according to an embodiment of the present disclosure may include an incident part 3100 and an exit part 3200.

The incident part 3100 may include a plurality of incident lenses 3110 and a first light transmitter 3120, and the exit part 3200 may include a plurality of exit lenses 3210 and a second light transmitter 3220.

The plurality of incident lenses 3110 may be arranged on an incident surface 3121 of the first light transmitter 3120, and the exit lenses 3210 may be arranged on an exit surface 3222 of the second light transmitter 3220. An exit surface 3122 of the first light transmitter 3120 and an incident surface 3221 of the second light transmitter 3220 may face each other, either in direct contact or in close proximity, allowing light incident upon the incident lenses 3110 to pass through the first light transmitter 3120 and the second light transmitter 3220 and be transmitted to the exit lenses 3210.

For example, micro lenses with a relatively short focal distance may be used as the incident lenses 3110 and the exit lenses 3210 to achieve miniaturization of the vehicle lamp 1.

In embodiments of the present disclosure, the incident lenses 3110 may be formed to have a semicylindrical shape that extends in the left-right direction, and the light incident upon each of the incident lenses 3110 may be emitted through two or more adjacent exit lenses 3210 arranged in the left-right direction. This configuration is intended to improve the spread characteristics of the beam pattern formed by the vehicle lamp 1. However, the present disclosure is not limited thereto, and the incident lenses 3110 and the exit lenses 3210 may correspond one-to-many, one-to-one, many-to-one, or many-to-many to each other, depending on the light distribution characteristics of the beam pattern formed by the vehicle lamp 1.

The first light transmitter 3120 may be formed with a thickness corresponding to the focal distance of the incident lenses 3110, and the second light transmitter 3220 may be formed with a thickness corresponding to the focal distance of the exit lenses 3210. When the first light transmitter 3120 and the second light transmitter 3220 abut each other, foci may be formed between the incident lenses 3110 and the respective exit lenses 3210 at or near the interface between the first transmitter 3120 and the second light transmitter 3220.

Each of the foci may be formed in the shape of a point, line, plane, space, or a combination thereof, depending on the shape of the area where light is substantially concentrated.

The incident lenses 3110 and the exit lenses 3210 may be defined by one or more lens characteristics (e.g., lens parameters), and these lens characteristics may include physical properties such as diameter, focal length, thickness, and curvature and optical properties such as brightness, sharpness, and color tone.

Figure 11:
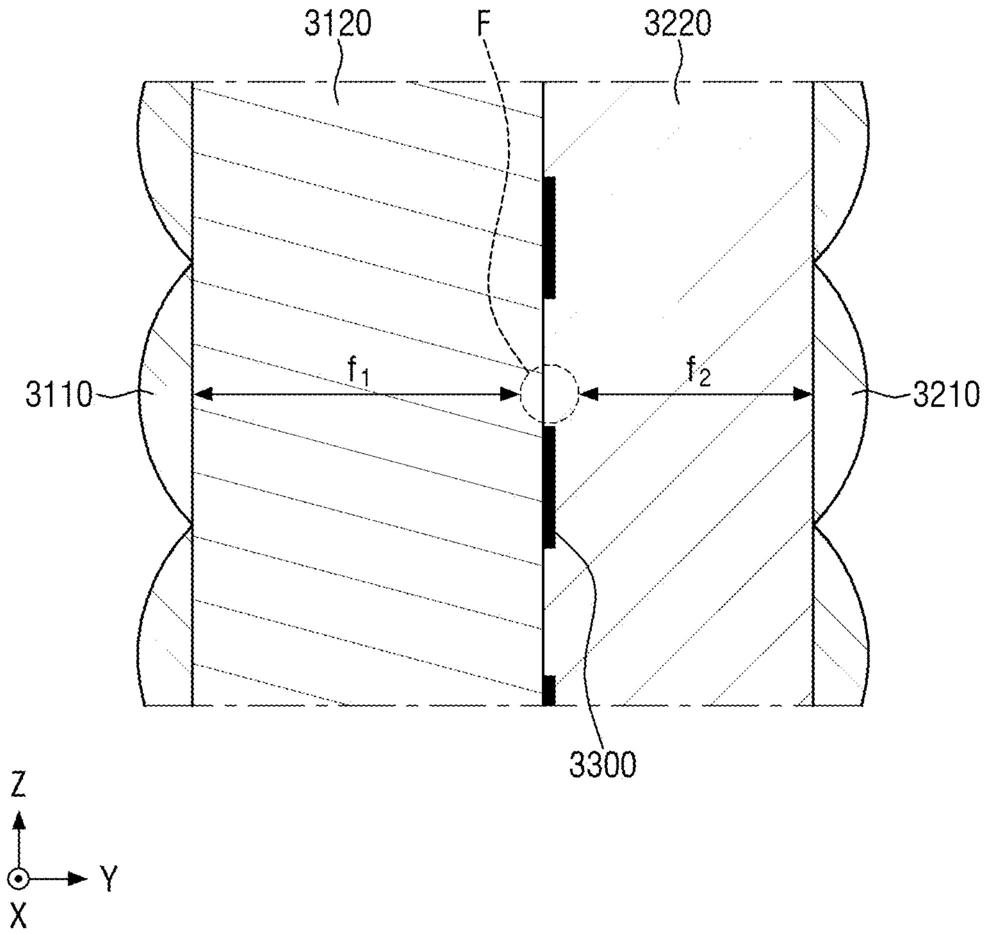
FIG. 11 is a cross-sectional view illustrating a portion of the optical unit according to an embodiment of the present disclosure.

FIG. 11 is a cross-sectional view illustrating a portion of the optical unit according to an embodiment of the present disclosure. Referring to FIG. 11, the optical unit 3000 may form a focus F between the incident lenses 3110 and the respective exit lenses 3210. The focus F may be an anterior focus of the incident lenses 3110 and a posterior focus of the exit lenses 3210.

In this case, a focal distance $f_1$ between the focus F and the incident lenses 3110 may be greater than a focal distance $f_2$ between the focus F and the exit lenses 3210. This configuration ensures that the light incident upon each of the incident lenses 3110 is focused on the corresponding focus F and directed into the corresponding exit lens 3210, preventing the light from entering adjacent exit lenses 3210.

In other words, as the focal distance $f_2$ increases, the size of the exit lenses 3210 needs to be increased to ensure that the light incident upon each of the incident lenses 3110 is directed into the corresponding exit lens 3210 with minimal loss. Therefore, by reducing the focal distance $f_2$ compared to the focal distance $f_1$, the need to increase the size of the exit lenses 3210 may be mitigated.

A plurality of shields 3300 may be respectively disposed between the incident lenses 3110 and the exit lenses 3210. Each of the plurality of shields 3300 may be disposed at or near the posterior focus of the corresponding exit lens 3210 to ensure that a low beam pattern P with a predetermined cutoff line CL is formed by the vehicle lamp 1, as described above with regards to FIG. 4.

In other words, the light that passes through the lower portion relative to the posterior foci of the exit lenses 3210 may be refracted upwardly. This results in light being projected above the cutoff line CL, potentially causing glare to the drivers of vehicles ahead. Therefore, the shields 3300 may block the light that passes through the lower portion relative to the posterior foci of the exit lenses 3210.

Figure 12:
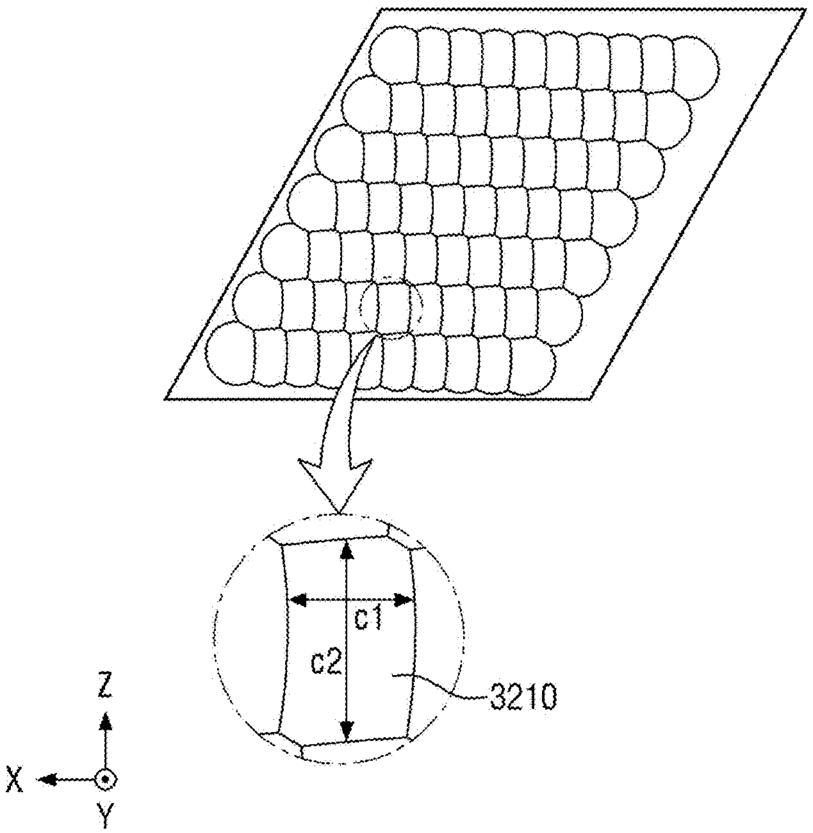
FIG. 12 is a schematic diagram illustrating the shapes of multiple exit lenses according to an embodiment of the present disclosure.

The exit lenses 3210 may be formed with a greater length c2 (e.g., height) in the up-down direction than its length c1 (e.g., width) in the left-right direction, as illustrated in FIG. 12. This configuration prevents the light incident upon each of the incident lenses 3110 from being emitted through not only the corresponding exit lens 3210 but also adjacent lenses, thereby avoiding the emission of light in unnecessary directions.

In other words, to shorten the focal distance $f_2$, the curvature of the exit lenses 3210 needs to be increased, which in turn increases the size (e.g., thickness) of the exit lenses 3210 in the front-rear direction. However, as the focal distance $f_2$ shortens, the area from which light is effectively emitted from each of the exit lenses 3210 decreases, which may lead to non-uniform brightness in the image formed by the light emitted from the vehicle lamp 1. Therefore, there is a limit in reducing the focal distance $f_2$.

Accordingly, in embodiments of the present disclosure, the exit lenses 3210 may be formed to have a greater length c2 than the length c1 so that the light that passes through each of the shields 3300 may be prevented from entering adjacent exit lenses 3210 and may ensure that the exit lenses 3210 have an appropriate size, while enabling the image formed by the light emitted from the vehicle lamp 1 to generally have uniform brightness.

Figure 13:
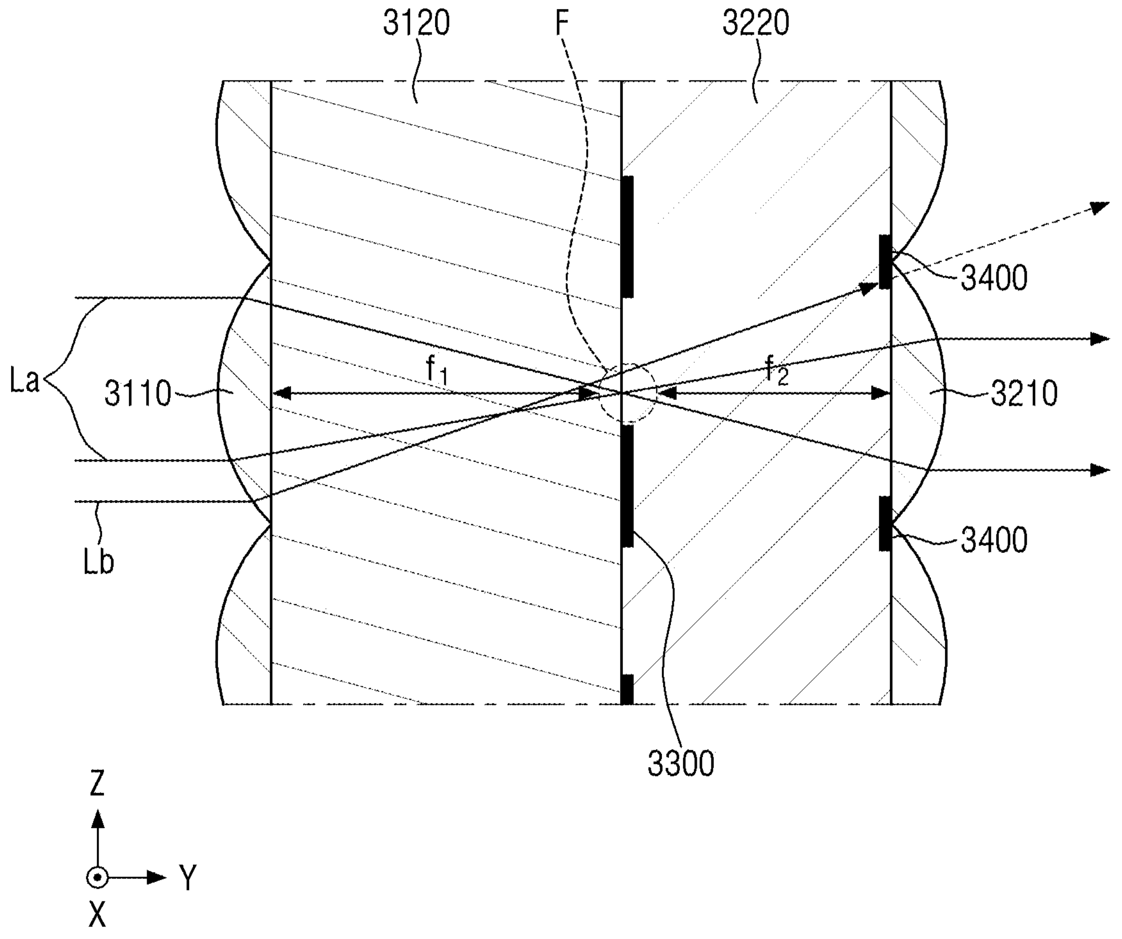
FIG. 13 is a schematic diagram illustrating the optical paths of the optical unit according to an embodiment of the present disclosure.

Meanwhile, referring to FIG. 13, even if the focal distances $f_1$ and $f_2$ and the lengths c1 and c2 are appropriately adjusted as discussed above, some of light (La and Lb) incident upon each of the incident lenses 3110, i.e., light Lb traveling close to the upper edges of the exit lenses 3210, may still be projected above the cutoff line CL, potentially causing glare. Therefore, an additional shield (e.g., auxiliary shield) 3400 may be formed between each pair of adjacent exit lenses 3210 in the up-down direction to prevent the occurrence of glare.

In FIG. 13, the dotted arrow represents the path of light when no additional shields 3400 are formed, which indicates that light incident upon or near the upper edges of the exit lenses 3210 may cause glare due to the light not being sufficiently refracted downwardly.

In embodiments of the present disclosure, the additional shields 3400 may be formed to prevent glare, but this may increase the costs and may complicate the manufacturing processes. Thus, measures are needed to reduce light emitted in unnecessary directions without forming the additional shields 3400.

To this end, in embodiments of the present disclosure, the incident lenses 3110 and the exit lenses 3210 may be designed such that the ratio between the lens characteristics (e.g., lens parameters) of the incident lenses 3110 and the lens characteristics (e.g., lens parameters) of the respective exit lenses 3210 may be adjusted appropriately.

Typically, the incident lenses 3110 and the exit lenses 3210 are formed such that the ratio between the focal distance of the incident lenses 3110 and the focal distance of the exit lenses 3210 is uniform. Further, the ratio between the diameter of the incident lenses 3110 and the diameter of the exit lenses 3210 is also uniform. Conversely, in embodiments of the present disclosure, the focal distance ratio and/or the diameter ratio between the incident lenses 3110 and the respective exit lenses 3210 may be configured to be non-uniform across the optical unit 3000.

Since the incident lenses 3110 and the exit lenses 3210 may have a square or a rectangular base shape, the term "diameter," as used herein, may be defined as a characteristic length of each lens. By way of example, the diameter may be defined as a diagonal length of the lens, the longest side of the lens, or the shortest side of the lens. By way of another example, the diameter may be defined as a diameter of an imaginary circle that circumscribes the base of the lens.

In embodiments of the present disclosure, the lens characteristics of the exit lenses 3210 may be configured to have different ratios relative to the lens characteristics of the respective incident lenses 3110 to reduce light emitted in unnecessary directions and thereby improve glare properties while satisfying the light distribution characteristics of the beam pattern to be formed by the vehicle lamp 1.

In the following description, focal distance and diameter will hereinafter be described as exemplary lens characteristics, but the present disclosure is not limited thereto. Various other lens characteristics that enable the control of the path of light entering the incident lenses 3110 and exiting through the respective exit lenses 3210 may also be used.

Figure 14:
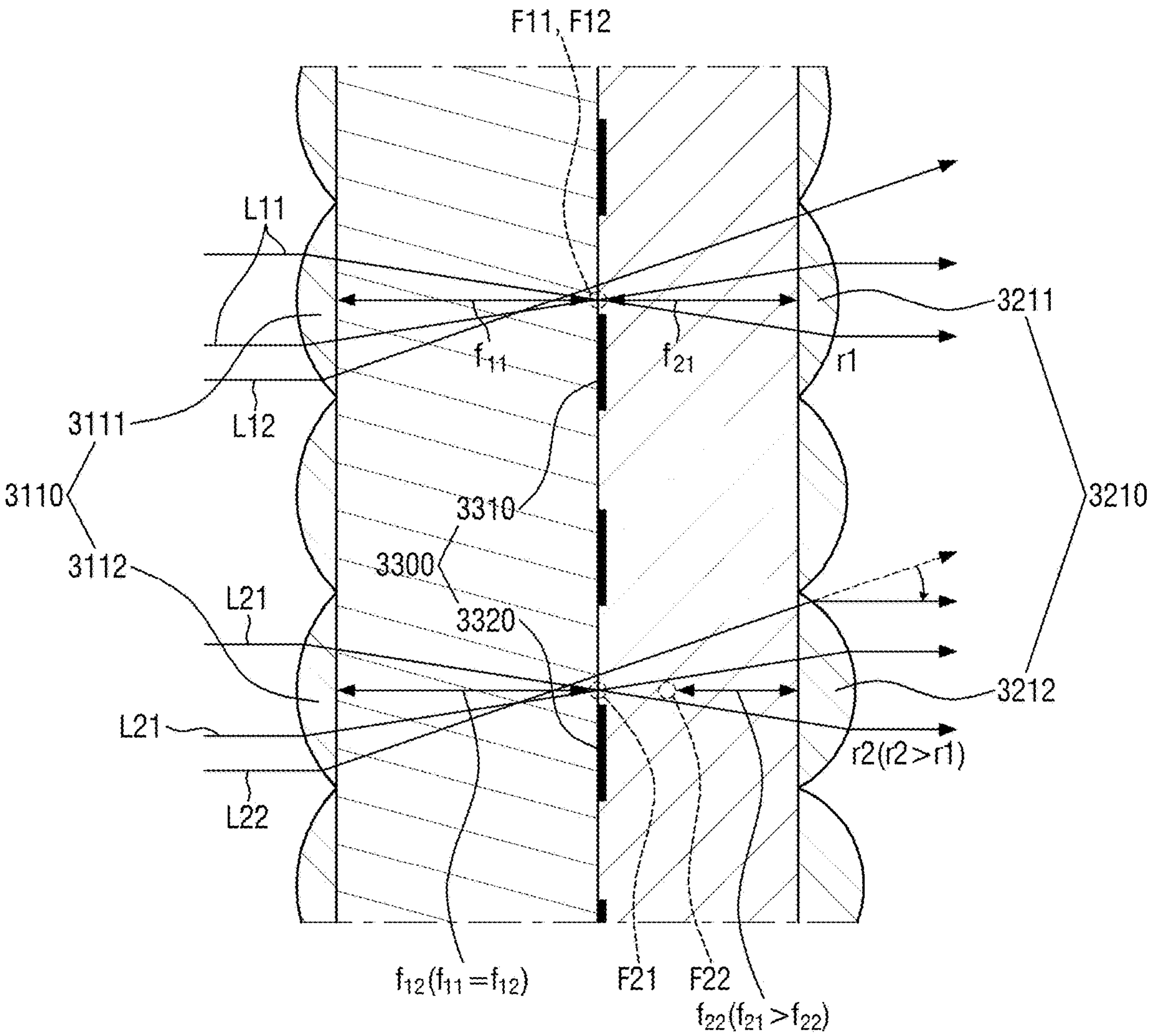
FIG. 14 is a schematic diagram illustrating the optical paths corresponding to the focal distances of the exit lenses according to an embodiment of the present disclosure.

FIG. 14 is a schematic diagram illustrating the optical paths corresponding to the focal distances of the exit lenses according to an embodiment of the present disclosure. Specifically, FIG. 14 illustrates an example where the incident lenses 3110 have a uniform focal distance, and the exit lenses 3210 have varying focal lengths.

Referring to FIG. 14, the incident lenses 3110 may include first and second incident lenses 3111 and 3112, and the exit lenses 3210 may include first and second exit lenses 3211 and 3212 corresponding to the first and second incident lenses 3111 and 3112, respectively.

The first and second incident lenses 3111 and 3112 refer to two different incident lenses among the plurality of incident lenses 3110 and may be understood as being disposed either adjacent to or apart from each other.

Similarly, the first and second exit lenses 3211 and 3212 may refer to two different exit lenses among the plurality of exit lenses 3210 and may be understood as being disposed either adjacent to or apart from each other.

In embodiments of the present disclosure, the first and second incident lenses 3111 and 3112 may be two incident lenses 3110 spaced apart from each other, and the first and second exit lenses 3211 and 3212 may be two exit lenses 3210 spaced apart from each other.

A focus F11 of the first incident lens 3111 and a focus F12 of the first exit lens 3211 may be formed at the same location, while a focus F21 of the second incident lens 3112 and a focus F22 of the second exit lens 3212 may be formed at different locations. In embodiments of the present disclosure, the incident lenses 3110 may have a constant focal distance, and thus, the foci F11 and F21 may be understood as being formed at the same location in the front-rear direction on the same plane.

In embodiments of the present disclosure, the focus F11 of the first incident lens 3111 and the focus F12 of the first exit lens 3211 may be formed at the same location since incident lenses 3110 and exit lenses 3210 whose foci are formed at the same location are needed to satisfy the light distribution characteristics of the beam pattern to be formed by the vehicle lamp 1. However, the present disclosure is not limited to this. Alternatively, the first incident lens 3111 and the first exit lens 3211 may have a different ratio of lens characteristics from the second incident lens 3112 and the second exit lens 3212.

In embodiments of the present disclosure, the focus F21 of the second incident lens 3112 and the focus F22 of the second exit lens 3212 may be formed at different locations to prevent the light from being emitted in unnecessary directions and thereby minimize glare.

In other words, generally, the incident lenses 3110 and the exit lenses 3210 are formed such that the ratio between the focal distance of the incident lenses 3110 and the focal distance of the exit lenses 3210 is uniform. In this case, however, light incident upon the upper edges of the exit lenses 3210 may not be properly refracted downwardly and may then be projected above the cutoff line CL, causing glare. As a result, as previously mentioned, the formation of the additional shields 3400 in front of the shields 3300 may be needed to prevent glare, leading to increased manufacturing costs and more complex manufacturing processes.

On the contrary, in embodiments of the present disclosure, a curvature r2 of the second exit lens 3212 may be formed to be greater than a curvature r1 of the first exit lens 3211, in other words, a radius of curvature of the second exit lens 3212 may be formed to be smaller than a radius of curvature of the first exit lens 3211, such that a focal distance $f_{22}$ of the second exit lens 3212 is relatively shorter than the focal distance $f_{21}$ of the first exit lens 3211. Consequently, the light incident near the upper edge of the second exit lens 3212 may be refracted sufficiently downwardly for emission, thereby improving the glare characteristics. In this case, it is possible to reduce the amount of light emitted in unnecessary directions without a need to form the additional shields 3400 in front of the shields 3300. Accordingly, manufacturing costs can be reduced, and manufacturing processes can be simplified.

When the focal distance $f_{22}$ of the second exit lens 3212 is relatively shorter than the focal distance $f_{21}$ of the first exit lens 3211, the ratio of a focal distance $f_{22}$ of the second exit lens 3212 to a focal distance $f_{12}$ of the second incident lens 3112, i.e., $f_{22}/f_{12}$, becomes smaller than the ratio of the focal distance $f_{21}$ of the first exit lens 3211 to the focal distance $f_{11}$ of the first incident lens 3111, i.e., $f_{21}/f_{11}$. In embodiments of the present disclosure, since the focal distances $f_{11}$ and $f_{12}$ of the first and second incident lenses 3111 and 3112 are equal, it may be understood that the ratio of the focal distance of the exit lenses 3210 to the focal distance of the respective incident lenses 3110 may vary depending on the difference between the focal distances $f_{21}$ and $f_{22}$ of the first and second exit lenses 3211 and 3212.

In this case, the ratio of the focal distance of the exit lenses 3210 to the focal distance of the respective incident lenses 3110 may preferably be equal to or less than $f_{21}/f_{11}$. This is because if the ratio of the focal distance of the exit lenses 3210 to the focal distance of the respective incident lenses 3110 is greater than $f_{21}/f_{11}$, it means that the curvature of the exit lenses 3210 becomes relatively smaller, resulting in a longer focal length. In this case, it becomes more difficult for the light incident near the upper edges of the exit lenses 3210 to be refracted sufficiently downwardly.

As described above, when the focus F11 of the first incident lens 3111 and the focus F12 of the first exit lens 3211 are formed at the same location, and the focus F21 of the second incident lens 3112 and the focus F22 of the second exit lens 3212 are formed at different locations, some of the light incident upon the first incident lens 3111, i.e., light L11, passes through a first shield 3310 among the plurality of shields 3300 and is emitted through the first exit lens 3211. However, some of the light, i.e., light L12, is incident near the upper edge of the first exit lens 3211, potentially causing glare. On the other hand, some of the light incident upon the second incident lens 3112, i.e., light L21, passes through a second shield 3320 among the plurality of shields 3300 and is emitted through the second exit lens 3212, and some of the light, i.e., light L22, is incident near the upper edge of the second exit lens 3212 but is refracted more downwardly compared to the light L12, thereby reducing the amount of light that can potentially cause glare. Accordingly, glare can be controlled more effectively.

In FIG. 14, the dotted arrow illustrates the emission path of the light L22 incident upon the upper edge of the second exit lens 3212 assuming that the curvatures of the first and second exit lenses 3211 and 3212 are equal.

In embodiments of the present disclosure, the exit lenses 3210 may be configured such that the focal distance of the exit lenses 3210 gradually increases or decreases going from one side to the other side in at least one direction, but the present disclosure is not limited thereto. Alternatively, various other configurations may also be possible, including a case where some of the exit lenses 3210 have a different focal distance from any other exit lenses 3210.

Also, in embodiments of the present disclosure, all of the incident lenses 3110 may have an identical focal distance, but the present disclosure is not limited thereto. Alternatively, since the ratio of the focal distances between the exit lenses 3210 and the respective incident lenses 3110 are relative, the present disclosure may also be applicable to a case where all of the exit lenses 3210 have an identical focal distance, but the focal length of the incident lenses 3110 gradually increases or decreases going from one side to the other side in at least one direction.

In other words, in embodiments of the present disclosure, the proportions of incident lenses 3110 and respective exit lenses 3210 where foci are formed at the same locations, the proportions of incident lenses 3110 and respective exit lenses 3210 where foci are formed at different locations, and the ratio of the focal distance of the incident lenses 3110 and the focal distance of the respective exit lenses 3210 may be appropriately adjusted, thereby achieving the desired light distribution characteristics of each beam pattern and improving the glare characteristics.

Figure 15:
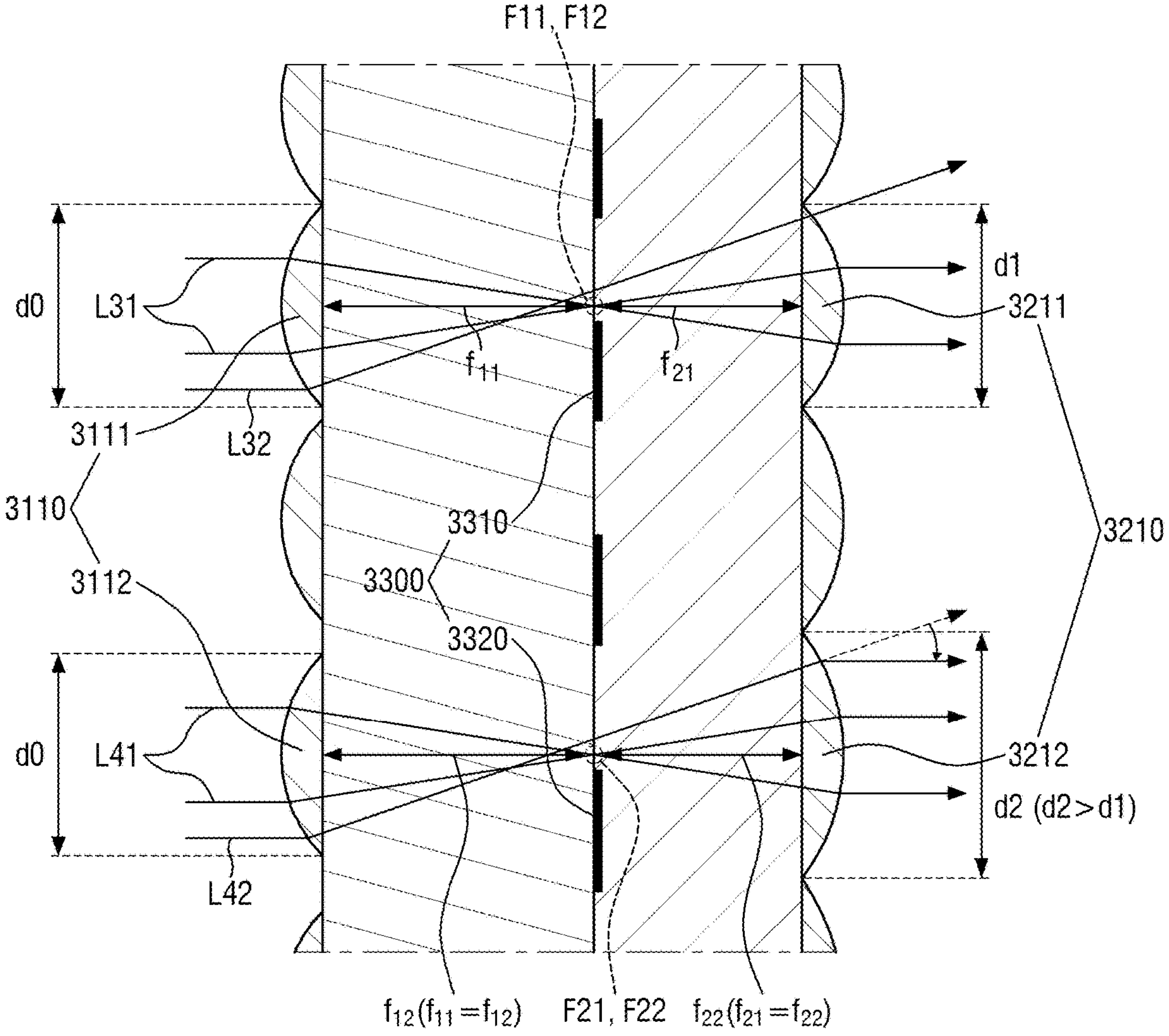
FIG. 15 is a schematic diagram illustrating the optical paths corresponding to the diameters of the exit lenses according to an embodiment of the present disclosure.

FIG. 15 is a schematic diagram illustrating the optical paths corresponding to the diameters of the exit lenses according to an embodiment of the present disclosure. Specifically, FIG. 15 illustrates an example where all of the incident lenses 3110 have an equal diameter, and the exit lenses 3210 have varying diameters.

Referring to FIG. 15, the incident lenses 3110 may include first and second incident lenses 3111 and 3112, and the exit lenses 3210 may include first and second exit lenses 3211 and 3212 corresponding to the first and second incident lenses 3111 and 3112, respectively.

The first and second incident lenses 3111 and 3112 may refer to two different incident lenses 3110 and may be understood as being disposed either adjacent to or apart from each other. Similarly, the first and second exit lenses 3211 and 3212 may refer to two different exit lenses 3210 and may be understood as being disposed either adjacent to or apart from each other. In embodiments of the present disclosure, the first and second incident lenses 3111 and 3112 may be two incident lenses 3110 spaced apart from each other, and the first and second exit lenses 3211 and 3212 may be two exit lenses 3210 spaced part from each other.

In FIG. 15, a focus F11 of the first incident lens 3111 and a focus F12 of the first exit lens 3211 may be formed at the same location, and a focus F21 of the second incident lens 3112 and a focus F22 of the second exit lens 3212 may also be formed at the same location. As a result, a focal distance $f_{11}$ of the first incident lens 3111 and a focal distance $f_{12}$ of the second incident lens 3112 may be the same, and a focal distance $f_{21}$ of the first exit lens 3211 and a focal distance $f_{22}$ of the second exit lens 3212 may also be the same.

Additionally, the first and second incident lenses 3111 and 3112 may be formed to have an identical diameter, and a diameter d1 of the first exit lens 3211 may be the same as the diameter of the first incident lens 3111. However, a diameter d2 of the second exit lens 3212 may be greater than the diameter d1 of the first exit lens 3211. In embodiments of the present disclosure, the diameters d1 and d2 of the first and second exit lenses 3211 and 3212 may be formed to be different to reduce the amount of light emitted in unnecessary directions and thereby improve the glare characteristics.

In embodiments of the present disclosure, the exit lenses 3210 may preferably have a diameter equal to or greater than the respective incident lenses 3110, considering that if the exit lenses 3210 are smaller than the respective incident lenses 3110, some of the light incident upon the incident lenses 3110 may not be incident upon the respective exit lenses 3210, potentially lowering light efficiency.

The first incident lens 3111 may be formed to have the same diameter as the first exit lens 3211 since incident lenses 3110 and exit lenses 3210 having the same diameter as the incident lenses 3110 are needed to satisfy the required light distribution characteristics of the beam pattern to be formed by the vehicle lamp 1.

For example, when the diameter of the exit lenses 3210 is greater than the diameter of the respective incident lenses 3110, the area through which the light is emitted from the exit lenses 3210 tends to spread out wider, making it more difficult to achieve the required brightness in a particular set area of each beam pattern. Therefore, it may be necessary to form the incident lenses 3110 and exit lenses 3210 to have the same diameter. However, the present disclosure is not limited to this. Alternatively, the first incident lens 3111 and the first exit lens 3211 may have different ratios of lens parameters relative to the second incident lens 3112 and the second exit lens 3212.

Where the first and second incident lenses 3111 and 3112 have a diameter d0 and the second exit lens 3212 has a diameter d2, which is greater than a diameter d1 of the first exit lens 3211, the ratio of the diameter d2 of the second exit lens 3212 to the diameter do of the second incident lens 3112, i.e., d2/d0, becomes greater than the ratio of the diameter d1 of the first exit lens 3211 to the diameter do of the first incident lens 3111, i.e., d1/d0. In embodiments of the present disclosure, since it is assumed that all of the incident lenses 3110 have an identical diameter, it may be understood that the ratio of the diameter of the exit lenses 3210 to the diameter of the respective incident lenses 3110 may be varied depending on the diameter differences between the first and second exit lenses 3211 and 3212.

In this case, the ratio of the diameter of the exit lenses 3210 to the diameter of the respective incident lenses 3110 may preferably be equal to or greater than d1/d0. This is because if the ratio of the diameter of the exit lenses 3210 to the diameter of the respective incident lenses 3110 is smaller than d1/d0, it means that the diameter of the exit lenses 3210 is smaller than the diameter of the respective incident lenses 3110, which may result in some of the light incident upon the incident lenses 3110 unable to be emitted through the respective exit lenses 3210, potentially decreasing light efficiency.

As described above, when the diameter of the first incident lens 3111 is equal to the diameter of the first exit lens 3211, and the diameter of the second exit lens 3212 is greater than the diameter of the second incident lens 3112, some of the light incident upon the first incident lens 3111, i.e., light L31, passes through the first shield 3310 and is emitted through the first exit lens 3211. However, some of the light, i.e., light L32, is incident near the upper edge of the first exit lens 3211, potentially causing glare. On the other hand, since the diameter of the second exit lens 3212 is greater than the diameter of the second incident lens 3112, some of the light incident upon the second incident lens 3112, i.e., light L41, passes through the second shield 3320 and is emitted through the second exit lens 3212. Additionally, some of the light, i.e., light L42 traveling toward the upper edge of the second exit lens 3212, is incident upon a location that is relatively further from the upper edge of the second exit lens 3212 in the downward direction than the light L32 is from the upper edge of the first exit lens 3211. Therefore, the light L42 can be refracted sufficiently downwardly for emission, thereby reducing the amount of light that can cause glare and enabled glare to be controlled better.

In FIG. 15, the dotted arrow illustrates the emission path of light incident upon the upper edge of the second exit lens 3212 under an assumption that the second exit lens 3212 has the same diameter as the first exit lens 3211.

In embodiments of the present disclosure, the exit lenses 3210 may be configured such that the diameter of the exit lenses 3210 may gradually increase or decrease going from one side to the other in at least one direction to facilitate molding, etc., but the present disclosure is not limited thereto. Alternatively, various other configurations may be possible, including a case where some of the exit lenses 3210 are formed with a different diameter from any other exit lenses 3210.

Additionally, in embodiments of the present disclosure, all of the incident lenses 3110 may have an identical diameter, but the present disclosure is not limited thereto. Alternatively, since the diameter ratios of the exit lenses 3210 to the respective incident lenses 3110 are relative, the present disclosure may also be applicable to a case where all of the exit lenses 3210 have an identical diameter, but the diameter of the incident lenses 3110 gradually increases or decreases going from one side to the other side in at least one direction.

In other words, in embodiments of the present disclosure, the proportions of incident lenses 3110 and exit lenses 3210 with the same diameter, the proportions of incident lenses 3110 and exit lenses 3210 with different diameters, and the ratio of the diameter of the exit lenses 3210 to the diameter of the respective incident lenses 3110 may be appropriately adjusted, thereby achieving the desired light distribution characteristics of each beam pattern and improving the glare control.

In the aforementioned embodiments, the focal distance variation and the diameter variation have been described in separate embodiments, but the present disclosure is not limited thereto. The ratio of the focal distance of the exit lenses 3210 to the focal distance of the respective incident lenses 3110 and the ratio of the diameter of the exit lenses 3210 to the diameter of the respective incident lenses 3110 may be varied in the same embodiment to satisfy the light distribution characteristics of each beam pattern while also improving the glare characteristics.

As described above, in the vehicle lamp 1, the ratio of the lens parameters of the exit lenses 3210 to the lens parameters of the respective incident lenses 3110 may be configured to vary across the optical unit 3000. Accordingly, the vehicle lamp 1 can satisfy the light distribution characteristics of each beam pattern while preventing light from being emitted in unnecessary directions, compared to a case where the ratio of the lens parameters of the exit lenses 3210 to the lens parameters of the respective incident lenses 3110 is uniform across the optical unit 3000.

In concluding the detailed description, those skilled in the art will appreciate that many variations and modifications can be made to the exemplary embodiments without substantially departing from the principles of the present disclosure. Therefore, the disclosed exemplary embodiments are to be used in a generic and descriptive sense only and not for purposes of limitation.

What is claimed is:

1. A vehicle lamp comprising at least one lamp module, wherein the at least one lamp module comprises:

a light source unit that includes at least one light source and generates light;

an optical path adjustment unit that adjusts a path of the light emitted from the light source unit; and an optical unit that transmits at least some of the light emitted from the optical path adjustment unit to form a predetermined beam pattern, wherein the optical unit includes a plurality of incident lenses and a plurality of exit lenses corresponding to one another, wherein a ratio of at least one lens parameter between a corresponding pair of exit lens and incident lens among the plurality of exit lenses and the plurality of incident lenses is different from a ratio of the at least one lens parameter between at least one other corresponding pair of exit lens and incident lens among the plurality of exit lenses and the plurality of incident lenses, wherein the plurality of incident lenses include a first incident lens and a second incident lens, wherein the plurality of exit lenses include a first exit lens and a second exit lens that correspond to the first incident lens and the second incident lens, respectively, wherein a ratio of a vertical length of the first exit lens to a vertical length of the first incident lens differs from a ratio of a vertical length of the second exit lens to a vertical length of the second incident lens, and wherein the first exit lens and the second exit lens have different vertical lengths.

2. The vehicle lamp of claim 1, wherein the at least one lens parameter includes at least one of curvature or diameter.

3. The vehicle lamp of claim 1, wherein a focal distance of at least some incident lenses among the plurality of incident lenses is greater than a focal distance of corresponding exit lenses among the plurality of exit lenses.

4. The vehicle lamp of claim 1, wherein a ratio of a focal distance of the first exit lens to a focal distance of the first incident lens differs from a ratio of a focal distance of the second exit lens to a focal distance of a second incident lens.

5. The vehicle lamp of claim 4, wherein a ratio of a focal distance of at least some exit lenses, among the plurality of exit lenses, to a focal distance of corresponding incident lenses, among the plurality of incident lenses, gradually increases or decreases going from one side to the other in at least one direction across the optical unit.

6. The vehicle lamp of claim 4, wherein either the plurality of incident lenses or the plurality of exit lenses have an equal focal distance.

7. The vehicle lamp of claim 4, wherein a focus of the first incident lens and a focus of the first exit lens are formed at a same location, and wherein a focus of the second incident lens and a focus of the second exit lens are formed at different locations.

8. The vehicle lamp of claim 7, wherein a ratio of a respective focal distance of at least some exit lenses, among the plurality of exit lenses, to a respective focal distance of corresponding incident lenses, among the plurality of incident lenses, is equal to or less than the ratio of the focal distance of the first exit lens to the focal distance of the first incident lens.

9. The vehicle lamp of claim 4, wherein the first incident lens and the second incident lens have different curvatures, thereby exhibiting different focal distances.

10. The vehicle lamp of claim 4, wherein the first exit lens and the second exit lens have different curvatures, thereby exhibiting different focal distances.

11. The vehicle lamp of claim 1, wherein a ratio of a vertical length of at least some exit lenses, among the plurality of exit lenses, to a vertical length of corresponding incident lenses, among the plurality of incident lenses, gradually increases or decreases going from one side to the other in at least one direction across the optical unit.

12. The vehicle lamp of claim 1, wherein the plurality of incident lenses have an equal vertical length.

13. The vehicle lamp of claim 1, wherein the first incident lens and the first exit lens have an equal vertical length, and wherein the second incident lens and the second exit lens have different vertical lengths.

14. The vehicle lamp of claim 13, wherein a ratio of a vertical length of an exit lens among the plurality of exit lenses to a vertical length of a corresponding incident lens among the plurality of incident lenses is equal to or greater than a ratio of the vertical length of the first exit lens to the vertical length of the first incident lens.

15. The vehicle lamp of claim 1, wherein the first exit lens and the second exit lens have different vertical lengths.

16. The vehicle lamp of claim 1, wherein each of the plurality of exit lenses is formed with a greater height in an up-down direction than a width in a left-right direction.

17. The vehicle lamp of claim 1, wherein the optical unit further includes a plurality of shields that block some of light from proceeding toward the plurality of exit lenses.

18. The vehicle lamp of claim 1, wherein the optical unit is formed to be tilted to allow one side thereof to be positioned more forward relative to the other side thereof in at least one direction.

19. A vehicle lamp comprising at least one lamp module, wherein the at least one lamp module comprises:

a light source unit that includes at least one light source and generates light;

an optical path adjustment unit that adjusts a path of the light emitted from the light source unit; and an optical unit that transmits at least some of the light emitted from the optical path adjustment unit to form a predetermined beam pattern, wherein the optical unit includes a plurality of incident lenses and a plurality of exit lenses corresponding to one another, wherein a ratio of at least one lens parameter between a corresponding pair of exit lens and incident lens among the plurality of exit lenses and the plurality of incident lenses is different from a ratio of the at least one lens parameter between at least one other corresponding pair of exit lens and incident lens among the plurality of exit lenses and the plurality of incident lenses, wherein each of the plurality of exit lenses is formed to have a greater vertical height in an up-down direction than a lateral width in a left-right direction, the left-right direction being substantially perpendicular to an optical axis of the light source unit, wherein the plurality of exit lenses include a first exit lens and a second exit lens, and the first exit lens and the second exit lens have different vertical lengths.

20. The vehicle lamp of claim 1, wherein the plurality of incident lenses have an equal vertical length.

* * * * *